(12) United States Patent
Downing et al.

(10) Patent No.: US 7,233,007 B2
(45) Date of Patent: Jun. 19, 2007

(54) RADIATION DETECTORS AND METHODS OF DETECTING RADIATION

(75) Inventors: R. Gregory Downing, Niskayuna, NY (US); W. Bruce Feller, Tolland, CT (US)

(73) Assignee: Nova Scientific, Inc., Sturbridge, MA (US)

( * ) Notice: Subject to any disclaimer, the term of this patent is extended or adjusted under 35 U.S.C. 154(b) by 178 days.

(21) Appl. No.: 11/068,589

(22) Filed: Feb. 28, 2005

(65) Prior Publication Data

US 2005/0205798 A1 Sep. 22, 2005

Related U.S. Application Data

(60) Provisional application No. 60/549,121, filed on Mar. 1, 2004.

(51) Int. Cl.
*G01T 3/06* (2006.01)
(52) U.S. Cl. .................................. 250/390.11
(58) Field of Classification Search ............ 250/390.11
See application file for complete search history.

(56) References Cited

U.S. PATENT DOCUMENTS

| | | | |
|---|---|---|---|
| 3,603,828 A | 9/1971 | Sheldon | |
| 3,634,713 A | 1/1972 | Foote | |
| 3,939,374 A | 2/1976 | Schagen et al. | |
| 5,086,248 A | 2/1992 | Horton et al. | |
| 5,391,101 A | 2/1995 | Aebi et al. | |
| 5,492,111 A | 2/1996 | Wheeler et al. | |
| 5,565,729 A | 10/1996 | Faris et al. | |
| 5,568,013 A | 10/1996 | Then et al. | |
| 5,939,613 A | 8/1999 | Naaman et al. | |
| 6,384,519 B1 | 5/2002 | Beetz et al. | |
| 2003/0205956 A1* | 11/2003 | Downing et al. | 313/104 |

OTHER PUBLICATIONS

"A Silicon Based Microchannel Plate Converter Screen and Image Intensifier for Fast Neutron Imaging with Amorphorous Silicon or Selenium Large Area Detector Arrays", University of Leicester, Microchannel Plate Group, www.src.le.ac.uk/mcp/neutron.html, updated Jul. 2001.
"MCP Optics", University of Leicester, Microchannel Plate Group, www.src.le.ac.uk/mcp/optics/mcp-optics.html, updated Jul. 2001.
"Microchannel Plate", Photonics Products, New Product Announcements, www.photonics.com/Spectra.NewProds/apr01/dPlate.html, Apr. 2001.
"Technical Brief, #1-Dynamic Range", Scientific Detector Products Technical Briefs, Burle Industries, Inc., www.burle.com/dettechbrief_1.htm, 2001.
"Microchannel Plate Imaging Neutron Detect", Nova Scientific, Inc., www.bmdotechnology.net/techsearch.asp?articleid=515, 2000-2001.

(Continued)

*Primary Examiner*—David Porta
*Assistant Examiner*—Mindy Vu
(74) *Attorney, Agent, or Firm*—Fish & Richardson P.C.

(57) ABSTRACT

Radiation detectors, such as neutron detectors, and methods of detecting radiation, are described.

29 Claims, 5 Drawing Sheets

OTHER PUBLICATIONS

"An electron multiplier capable of working at low vacuum: The microsphere plate", Ron Naaman, Rev. Sci. Instrum. 67 (9), Sep. 1996.

"Longscale Microchannelplate F6492", Hamamatsu, 1997.

"Ion Detectors", Scimedia: Ion Detectors, http://elchem.kaist.ac.kr/vt/chem-ed/ms/detector/detector.htm 1996.

Tremsin et al., "The Microsphere Plate: a new type of electron multiplier", Nuclear Instruments and Methods in Physics Research A. 368 (1996) 719-730.

"The Micro Sphere Plate: A novel electron multiplier", El-Mul Technologies, Nuclear Instruments and Methods in Physics Research, Section A, vol. 368, No. 3, p. 719-30, Jan. 11, 1996.

Joseph Ladislas Wiza, "Microchannel Plate Detectors", Nuclear Instruments and Methods, vol. 162, 1979, pp. 587-601.

Fraser et al., "Thermal neutron imaging using microchannel plates", Neutrons, X-rays and Gamma Rays: Imaging Detectors, Materials Characterization Techniques and Applications, Spie Proceedings, vol. 1737, Jul. 21-22, 1992, San Diego, Ca.

"Microchannel Plate (MCP)" www.hpk.co.jp/eng/products/Etd/MCPE.htm, retrieved Jan. 9, 2002.

"Microchannel Plate Imaging Detectos", www.nasatech.com/ITB/FR/T7_330.html, retrieved Jan. 9, 2002.

"Microchannel Plate Principles of Operation", http://hea-www.harvard.edu/HRC/mcp/mcp.html, retrieved Jan. 9, 2002.

Greg Downing et al., "Neutron Detection and Imaging using Microsphere Plates", Nova Scientific, Inc., Jun. 20, 2001.

El-Mul Technologies, http://el-mul.co.il, retrieved Jun. 23, 1999.

MicroSphere Plates, www.tectra.de/e/detect.htm, updated Sep. 28, 1999.

Bradley, Peter D., "The development of a Novel Silicon Microdosimeter fro High LET Radiation Therapy", University of Wollongong, Department of Engineering Physics, 2000.

International Search Report for PCT/US2003/013857 Mailed Mar. 23, 2004.

\* cited by examiner

RADIATION DETECTORS AND METHODS OF DETECTING RADIATION

CLAIM OF PRIORITY

This application claims priority under 35 U.S.C. §119(e) to U.S. Patent Application Ser. No. 60/549,121, filed on Mar. 1, 2004, the entire contents of which are hereby incorporated by reference.

TECHNICAL FIELD

The invention relates to radiation detectors and methods of detecting radiation.

BACKGROUND

Figure 1:
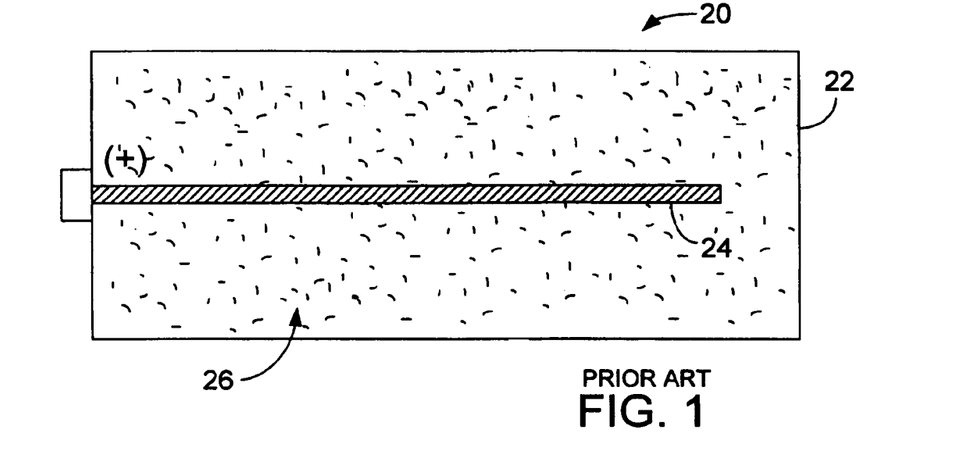
FIG. 1 is a schematic cross-sectional view of a gas-based neutron detector.

Certain detectors, such as those used for homeland security or scientific research instruments are capable of detecting radiation, such as neutrons. One type of neutron detector is a gas-based neutron detector. Referring to FIG. 1, a gas-based neutron detector 20 includes a housing 22, an electrode 24, and one or more gases 26 (such as $^3$He gas), both of which are in the housing. As shown, electrode 24 is a positively charged wire that is isolated from the walls of housing 22, which is held at ground potential or negative relative to the electrode. Gas(es) 26 is filled in housing 22, e.g., from about 1 to about 20 atmospheres.

During use, incident radiation, such as neutrons, interacts with gas(es) 26 to produce charged particles that ionize the gas atoms and produce electrons, which can be detected. More specifically, as neutron radiation traverses through gas(es) 26, the neutrons interact with the gas(es) and produce charged particles, such as protons and tritons ($^3$H). The charged particles then ionize gas(es) 26 to form gas ions and electrons. The gas ions can be accelerated to the walls of housing 22, while the electrons are accelerated to electrode 24, thereby producing a detectable electrical pulse. The intensity of the electrical pulse can provide an indication of the level of neutrons detected.

SUMMARY

The invention relates to radiation detectors and methods of detecting radiation.

In one aspect, the invention features a detector, including a structure having a plurality of connected fibers defining spaces between the fibers; and a first material in the spaces, the material being capable of interacting with charged particles to produce one or more electrons or photons.

In another aspect, the invention features a method of detecting radiation, such as neutrons. In embodiments, the method includes contacting neutrons to a structure having connected fibers defining spaces between the fibers, and a first material in the spaces, the neutrons producing one or more charged particles; contacting the one or more charged particle to the first material to produce one or more electrons; and detecting the one or more electron.

In another aspect, the invention features a method of detecting neutrons, the method including contacting neutrons to a structure comprising connected fibers defining spaces between the fibers, and a first material in the spaces, the neutrons producing one or more charged particles; contacting the one or more charged particles to the first material to produce one or more photons; and detecting the one or more photons.

Embodiments may have one or more of the following advantages. In some embodiments, the efficiency of the detectors can exceed that of $^3$He detectors by more than an order of magnitude for neutron energies above thermal, and approach its performance at thermal energies. On a volume and cost basis, the efficiency of the detectors can exceed the efficiency of $^3$He detectors at a greater rate, e.g., in light of the cross section advantage of $^3$He, due to the optimized mass density and topography. The increased efficiency creates significant cost savings and improved performance for applications ranging from miniature pager-type personal alarms to survey instruments to large area monitoring arrays. For example, the detectors can be used for signaling the presence and locality of small quantities of isotopic neutron sources, such as U, Pu, Cm, and Cf.

The detectors and/or reticulated structures can be easily shaped to assume regular or irregular packaging. The detectors and/or reticulated structures can be scalable to large areas with mosaic of multiple detectors, e.g., from mm$^2$ to >m$^2$. The detectors can be mechanically robust, e.g., similar to $^3$He detectors. The detectors can be operated on equivalent or lower power, e.g., relative to continuous operation than $^3$He. The detectors can be easily integrated with other radiation detectors and existing electronics. The detectors can exhibit a low level of background noise, e.g., low γ/n and muon/n background. In embodiments including the $^{10}$B nuclide, which has a low atomic number (Z=5), gamma-ray photons do not efficiently create ionization tracks.

Other aspects, features and advantages of the invention will be apparent from the description of the preferred embodiments thereof and from the claims.

DETAILED DESCRIPTION

Figure 2:
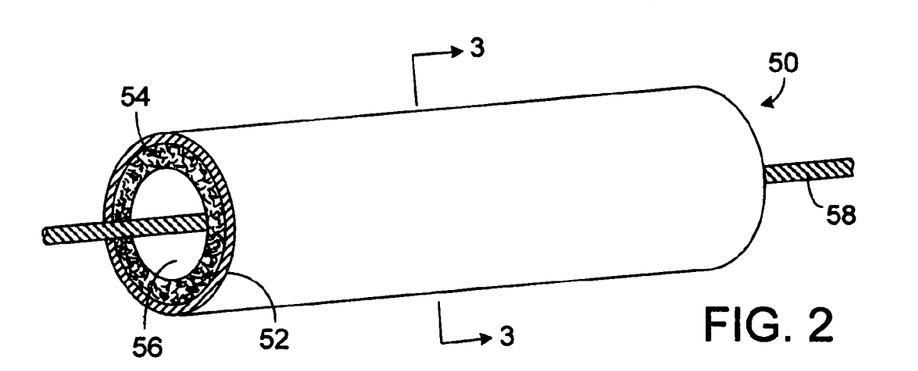
FIG. 2 is a perspective illustration of a radiation detector.
Figure 3:
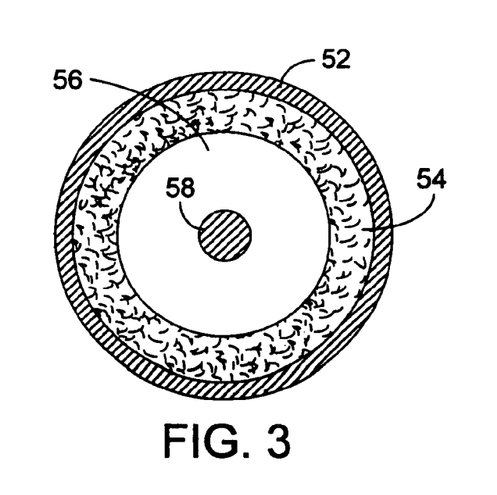
FIG. 3 is a cross-sectional view of the radiation detector of FIG. 2, taken along line 2-2.

Referring to FIGS. 2 and 3, a radiation detector 50 includes an enclosed cylindrical housing 52, a reticulated structure 54 in the housing, one or more gases 56 in the housing, and an electrode 58 extending in the housing. Reticulated structure 54 includes one or more materials (e.g., $^{10}$B) capable of interacting with incident radiation (e.g., neutrons) to produce charged particles (e.g., protons). Gas 56 is capable of interacting with (e.g., being ionized by) the charged particles. In some embodiments, gas 56 is capable of reacting with the incident radiation, e.g., the gas may be neutron sensitive. Electrode 58 functions as a positive electrode and a charge collector, and is connected to a readout (not shown).

During use, incident radiation (such as neutrons) pass through housing 52 and strike reticulated structure 54. The incident radiation interacts with the material of reticulated structure 54 (such as $^{10}$B) to produce charged particles, such as alpha particles. The charged particles in turn interact with gas 56 (such as a noble gas), and ionize the gas to produce ionized gas atoms and electrons. The ionized gas atoms can be accelerated to the walls of housing 52, which can be electrically grounded or more negative than electrode 58. The electrons are accelerated to electrode 58, where they can be detected by the readout to provide an indication of the intensity of the incident radiation.

Figure 4:
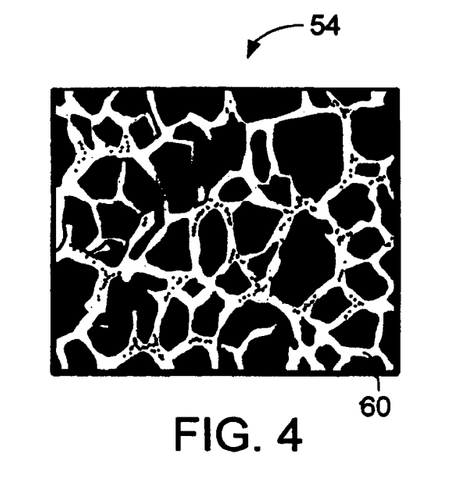
FIG. 4 is a detailed view of a reticulated structure.

Referring to FIG. 4, reticulated structure 54 has a complex network structure. The network structure can resemble the microscopic structure of a sponge, an open-cell foam, cancellous bone, slightly bonded felt, or three-dimensional layers of netting. The structure includes a network of cells or passages that extend across reticulated structure 54. As shown, the cells are defined by a multitude of randomly connected fibers, ligaments, or ribs 60 that include one or more materials capable of interacting with incident radiation to produce charged particles. Portions of fibers 60 are fused to other fibers; while other portions of fibers 60 not fused to other fibers remain exposed, e.g., to gas(es) 56.

Reticulated structure 54 is capable of enhancing the detection efficiency, e.g., for the volume of collection area of the detector, and enhancing detection efficiency at various radiation energies. Reticulated structure 54 can uniformly position many atoms with high neutron reactivity into a small area or volume, while also allowing the induced reaction to create an electron pulse that can be detected and electronically recorded or displayed by electronic equipment. For example, in embodiments, orders-of-magnitude more boron atoms per unit volume can be incorporated in a detector including a reticulated structure than possible by using, e.g., $^3$He gas as the sole neutron converter. The substantially greater atom density provided by reticulated structure can overcome the disadvantage of lower nuclear reaction cross section ($^3$He/$^{10}$B~1.39 to approx. 500 keV). Moreover, the reticulated structure can provide escape efficiency of energetic neutron reaction products ($^4$He & $^7$Li, shared Q-value~2.79 MeV) from the solid state into the gas with enough residual energy to produce an ionization pulse. Reticulated structure 54 is also lightweight and allows detector 50 to be formed for many applications, including thin plates, thick plates, and tubes of various diameters and lengths.

Reticulated structure 54 includes solid, porous, and/or hollow fibers 60 having one or more materials capable of interacting with incident radiation, such as neutron sensitive materials. The materials capable of interacting or reacting with incident radiation include those capable of neutron capture, including resonance neutron reactions, to energetically release neutrons, beta particles, positron particles, alpha particles, triton particles, protons, recoil masses, fission, scattering recoil or knock-on particles, and/or photon radiation, such as x-ray radiation or gamma-ray radiation. The reactions can also yield delayed decay emissions, such as uranium capture and the delayed emission of neutrons or other radiation.

In preferred embodiments, reticulated structure 54 is constructed so as to have reduced (e.g., minimized) production of background signals, for example, from radiation not originating from neutron radiation traversing the volume of detector 50. For example, depending on the intended application of detector 50, low atomic number elements, such as boron and lithium, can be used, and high atomic elements can be reduced or eliminated. Other examples of materials include boron metal and boron compounds, such as boron carbide (e.g., $BC_4$), boron oxides, boron nitrides, borated ceramics, borated hydrocarbons, boron glass, and boron mixtures with other neutron reactive elements and nuclides.

The boron can be isotopically enriched in $^{10}$B for enhanced neutron reactive properties, or depleted in $^{10}$B to achieve other specific neutron properties, such as low capture cross sections. $^{10}$B has a low atomic number and density, which can enhance escape of reaction products and produce less interaction with photon radiation. Reticulated structure 54 can include fissionable nuclides, such as $^{235}$U, $^{239}$Pu, $^{237}$Np, and/or $^{238}$U, to allow detection of neutrons at nuclide inherent energy thresholds. Other examples of neutron sensitive material include $^3$He, $^6$Li, $^{10}$B, $^{113}$Cd, $^{149}$Sm, $^{151}$Eu, $^{155,157}$Gd, U and/or Pu or mixtures of these materials, as a component of the fiber in ordinary isotopic ratios or in excess of their natural abundance.

Fibers 60 can also be formed to take advantage of fast neutron scatter cross sections that yield recoiling energetic proton. For example, the fiber can include a hydrogen-rich compound(s), such as polyethylene or nylon, that may or may not contain nuclides with good neutron capture properties, such as $^6$Li, $^{10}$B, or Gd. The dimensions of fibers can be controlled to enhance the escape of the recoil proton, and possibly the secondary neutron capture reaction particles, into the volume between the fibers. The dimensions of the fibers can be constructed with regard to the expected energy (or range of energies) of the incident neutron to be detected.

Fibers 60 may include a range of concentrations of neutron sensitive material. In some embodiments, fibers 60 include between about 0% and about 100% by weight of neutron sensitive material, e.g., greater than or equal to about 0%, 5%, 10%, 15%, 20%, 25%, 30%, 35%, 40%, 45%, 55%, 60%, 65%, 70%, 75%, 80%, 85%, 90%, 95%, or 100% and/or less than or equal to about 100%, 95%, 90%, 85%, 80%, 75%, 70%, 65%, 60%, 55%, 50%, 45%, 40%, 35%, 30%, 25%, 20%, 15%, 10%, 5%, or 0%.

In other embodiments, the neutron sensitive material forms a discrete portion of a fiber, e.g., a ribbon-like glass fiber. For example, a fiber can contain a core of neutron sensitive material surrounded by one or more surface layers. The chemical composition of the fiber may be varied as a function of the distance from the outer surface of the fiber. By decreasing the amount of neutron-sensitive material at depths where neutron-induced reaction products (charged particles, neutrals, and electrons) would be unable to escape to the surface and where such depths exceed the range of these reaction products, a chemical gradient is formed within the particle. Establishing this gradient or preferential layer enriched in neutron-sensitive material can increase the neutron detection efficiency of a detector by preventing neutrons from being absorbed at depths in the particle where they may not be effective and where the reaction products may be unable to escape and thus not contribute to the detection process. This can effectively increase the number of neutrons passing through the particle and increase the probability of such surviving neutrons interacting with other particles (e.g., fibers). The percentage of neutrons interacting with a given particle that yield a reaction product that escapes the particle may also be increased.

In embodiments, a preferred maximum radius of the core is approximately the distance traveled by a neutron induced particle, but less than the distance to the outer surface of the surface layer. The thickness of the core can be greater or less than the distance traveled by the neutron-induced particle. If the size of the core is greater than the range of a neutron-induced particle, the effectiveness of the reactions to produce electrons in the gas can be decreased. If the radius is less than the range of the induced charged particle, the effectiveness of the reaction to produce electrons in the gas can be increased. If the radius of the core is within the range or greater, a chemical gradient of the neutron sensitive material is preferably formed in which the region farthest away from the outer surface of the particle and greater than the range of the neutron induced particles is depleted of or reduced in neutron sensitive material. The surface layer(s) can have a thickness of several thousand Angstroms, and the layer may or may not contain neutron sensitive material.

Fibers having a core of neutron sensitive material surrounded by a surface layer can be formed by vapor phase chemical deposition or solution deposition or powder deposition followed by/or concurrent with ultrasonic, photon, chemical and/or heat processing.

Alternatively or additionally, in some embodiments, reticulated structure 54 includes, e.g., up to 100%, one or more materials capable of interacting with other types of radiation. For example, the material(s) may be composed of elements with high atomic number, such as lead, uranium, tungsten, and/or tantalum, to interact with x-rays, gamma rays, and/or muons. Other materials and/or reticulated structure surface treatments with low electron work functions can be used. These interactions can also generate electrons or photons in the volume surrounding the fibers and/or reticulated structure that is detected by anodes or cathodes or electronic photosensors.

Fibers 60 can be fabricated from a variety of solids, such as glass (e.g., borosilicate glass, lithium glass, and gadolinium glass), plastic, metal, ceramic, or mixtures of solids. For example, fibers 60 can include a material capable of enhancing the detection of fast neutrons by proton recoil from the neutron scattering reaction. Examples of materials include hydrogenous compounds, for example, polyethylene, nylon, rayon, polypropylene, polyether ether ketone (PEEK), and polyurethane.

In some embodiments, fibers 60 may include two or more layers of different compositions, as viewed as a cross section of the ligament. The layers may be concentric. For example, the core of a fiber 60 may contain a compound encased in a surrounding solid coating. The layers may be coextensive or intermittent, e.g., marbled into the fiber. The coating may be relatively thin or thick fraction of the fiber to impart properties of an electrical conduction, insulation, or radiation absorption or reflective nature and/or to contain the inner portion of the fiber. The coating may completely cover the surface of the fiber, or only a portion of the fiber. The coating may include one or more neutron reactive element or compound. For example, the coating may include $^{235}$U, $^{239}$Pu, $^{237}$Np, $^{238}$U, and/or other fissionable nuclides to impart the properties of detection of neutrons at nuclide inherent energy thresholds. The coating may be of a quality that easily releases electrons when an energetic neutron reaction particle escapes from the bulk of the ligament but the coating may not be significantly neutron reactive.

In some embodiments, the surface of fibers 60 is coated with a thin electrically conductive layer. The surface or near-surface of the fiber can serve as an electrode to collect the ions or electrical charge pulse from the ionization of the neutron induced particle traversing gas 56. The layer can be positively or negatively charged to attract or repel electrons or ions from the gas, and to conduct the resulting electrical pulse for detection by electronics attached to the detector. The electrically conductive layer can include, for example, gold, silver, copper, aluminum or other metals and semiconductor compounds to achieve electrical conductance and resistance, while maintaining chemical and magnetic and optical properties during the operation and storage of the detector.

In preferred embodiments, fibers 60 have a structure that has a high surface area and a low cross-sectional dimension (e.g., thickness). Having a high surface area increases the geometric possibility that particles escaping from the bulk can pass through and interact with gas(es) 56. The high surface area also allows more, for example, neutron-sensitive material to be loaded into detector 50, e.g., without loss of signal due to self absorption. The low cross-sectional dimension (e.g., thinness) provides a geometry and topography in which the distance from the surface of a fiber to the bulk of the fiber is reduced (e.g., minimized), for example, to facilitate efficient escape of reaction or knock-on particles of neutron reactants into the gaseous spaces between the fibers. The distance a reaction product, such as a neutron-induced particle, needs to travel to escape from the fiber interior or bulk is preferably relatively small, compared to, for example, a cylindrically-shaped fiber. As a result, the reaction product can escape easily from the fiber, thereby interacting with gas(es) 56 and producing ionization reactions or scintillation photons (described below).

Fibers 60 are preferably thin and shaped such that the path of each reaction product crosses through or nearly through the surface of a fiber. For example, if the fiber was primarily boron or $^{10}$B, the linear range of a thermal neutron induced alpha particle from the 94% decay branch (1472 keV) is approximately 3.6 microns. Therefore, the distance from the surface of the fiber to the deepest, e.g., most central, location in the fiber is preferably less than 3.6 microns; otherwise, reactions at that depth may not reach the outside of the fiber. Fibers with greater thickness may be used, but may function with reduced detection efficiency. In some embodiments, however, the fibers may be constructed with greater or lesser thicknesses, depending upon the desired properties for the detector, such as for example, additional mechanical ruggedness, or mechanical flexibility, or a multilayer fiber with a core containing nuclei or compounds that emit higher energy particles or photons, or a fiber core that absorbs a specific range of neutron energies or gamma photons or other radiation, or a hydrogen rich core where the surround fiber would filter and prevent "knock-on" neutron products (e.g., a proton, from reaching the surface of the fiber unless the particle energies exceed a predetermined value. For example, with boron, there are additional combinations of particle radiation from a neutron reaction such as the recoil $^7$Li particle and the particles from the 6% yield branching ratio of the neutron-boron reaction that are more energetic particles. In 6% of the $^{10}$B neutron reactions, the alpha particle has an initial energy of 1776 keV and the recoil particle ($^7$Li) has an energy of 1040 keV. If the incident neutron energy is significantly greater than thermal energies, the neutron energy can be transferred and added to the nuclear reaction products.

At the same time, fibers 60 define a reticulated structure such that the inter-fiber passages are preferably sufficiently open and spaced to allow a relatively large number of particles to flow and reach the electrode. For example, reticulated structure 54 can permit the electrons and/or ions to travel from the point of generation to electrode 58 or one of several electrode surfaces (described below). Relatively open and spaced passages can also enhance reticulated structure 54 mechanically. The passages can also enhance reticulated structure 54 electrically, allowing relatively strong electric field gradients to be supported. Fused fibers that are too closely spaced may constrict the inter-fiber passages into dead ends.

The distance between fibers 60 that form reticulated structure 54 is preferably optimized to allow the neutron induced particles to deposit the greatest portion of their energy in ionizing the gas and to produce electrons that are directed to electrode 58. The dimensions that defined the separation of fibers 60 can depend upon, for example, the type of gas and the pressure of gas used to fill housing 52. For example, for the same pressure of gas, the charge particles can lose energy faster, in decreasing order, in xenon, than in krypton, than in argon, than in neon, than in helium. In certain embodiments, the average fiber-to-fiber distance, is about 50 microns to about 500 microns.

In some embodiments, fibers 60 form a network in which the fibers are interconnected together by butt end junctions, similar to stove pipe junctions. Near the junctions, fibers 60 preferably tapered down in size and join together, without any increases in mass (which can lower the surface area to cross section ratio). Multiple fibers 60 define cells, or void volumes, through which reaction products travel as they exit the bulk fiber and strike another fiber. The morphology of the cells can be relatively isotropic, or the morphology can be adjusted, e.g., made more anisotropic.

In certain embodiments, fibers 60 have a ribbon-like form in which the width of the fiber is larger than the thickness of the fiber. As used herein, the widths and thicknesses of fibers 60 are the average widths and thicknesses. The particular fiber dimensions can be dependent upon the type of radiation being detected. For neutron detection, bulk detection with a material such as $^{10}$B, $^{6}$Li, $^{155,157}$Gd, or $^{nat}$Gd, or for X-ray detection, bulk detection with a material such as Pb, the thickness of fibers 60 can be, for example, about 2 to about 50 microns. The thickness can be greater than or equal to about 2, 5, 10, 15, 20, 25, 30, 35, 40, or 45 microns; and/or less than or equal to about 50, 45, 40, 35, 30, 25, 20, 15, 10, or 5 microns. The width (W) of fibers 60 can be, for example, about 5 to about 100 microns. The width can be greater than or equal to about 5, 10, 20, 30, 40, 50, 60, 70, 80, or 90 microns; and/or less than or equal to about 100, 90, 80, 70, 60, 50, 40, 30, 20, or 10 microns. For X-ray or gamma-ray detection, or for fast neutron detection with a hydrogen rich fiber, the thickness of fibers 60 can be, for example, about 5 to about 500 microns.

Alternatively or additionally, fibers 60 can be expressed as having an average width (W) to thickness (T) ratio of between about 1:1 and about 50:1. For example, the width to thickness ratio can be greater than or equal to about 1:1, 10:1, 20:1, 30:1, or 40:1; and/or less than or equal to about 50:1, 40:1, 30:1, 20:1, or 10:1.

The cross-sectional shape of fibers 60 is not limited. Fibers 60 can have an oval or elliptical cross section. Other fibers having cross-sectional shapes with high surface areas are possible, such as extruded star-shaped fibers with multiple (e.g., three, four, five, six, seven, eight, nine, ten or more) vertices. Fibers 60 can have rounded, smooth surfaces, or surfaces that are textured, porous, or have topography to enhance the efficient escape of radiation from the fibers into the external volume surrounding the fibers. The length of fibers 60 may not only be linear in shape, but may be wavy, helical, or random along the length in shape or direction between junctions with another fiber.

Reticulated structure 54 can be formed from a foam substrate. The foam substrate can be made of a light-weight, structural material, such as building insulation materials. The substrate preferably has physical properties, such as heat resistance and conductivity/resistivity, such that it can be formed into a detector. The foam substrate can include a radiation reactive material (e.g., a neutron sensitive material or an X-ray sensitive material). The foam substrate can include, for example, silicon carbide (e.g., SiC), boron nitride (e.g., BN), boron carbide (e.g., B$_4$C), and/or carbon (e.g., vitreous carbon), borosilicate glass, lithium glass, gadolinium glass or comparable ceramic materials, or a combination of these materials. The substrate may contain one of these materials and also particles or inclusions of highly neutron reactive nuclides and nuclide compounds including but not limited to $^{3}$He, $^{6}$Li, $^{10}$B, $^{113}$Cd, $^{149}$Sm, $^{151}$Eu, $^{155,157}$Gd, and/or U or $^{1,2,3}$H. For hard X-ray or gamma ray detection applications, the foam substrate can include, for example, a lead glass or other high atomic number element with high X-ray interaction. Examples of foam substrates are available from ERG Materials and Aerospace Corporation (Oakland, Calif.). Open-cell polymer foams, such as those including nylon, high density polyethylene, or other compounds, can also be used. In embodiments, such as those in which the foam substrate is a polymer or carbon, the substrate can be removed by heating, leaving a reticulated structure with the desired material remaining in place, e.g., a hollow core fiber.

The reticulated substrate can be coated with the neutron reactive material using one or more techniques. Suitable techniques include solution or sol-gel methods or vapor deposition, such as chemical vapor deposition or physical vapor deposition, such as sputtering. Another technique is a glass frit technique in which a fine powder of the neutron reactive material is applied (dry or liquid) to the foam substrate, shaken to allow the neutron reactive material to penetrate the foam, and heated to melt the material and coat the foam. The coating process can be assisted by electrical plating, electrostatic, or ion implantation methods.

Other methods of making reticulated structures are possible. For example, the neutron reactive material described above can first be extruded as cylindrically shaped fibers. Then, the cylindrically shaped fibers can be heated until the malleable, and deformed (such as be stretching and/or compressing) to form, for example, ribbon-like fibers. The reticulated structure can then be formed by placing the deformed fibers in a liquid carrier, allowing the fibers to fall on a substrate, and drying the fibers to form a flexible mat. The liquid carrier can be, e.g., a solution having properties of specific densities, pH, viscosities or other characteristic to facilitate the uniform distribution of fibers. The substrate can be, e.g., a porous or adsorbent surface such that the liquid can be removed with minimal disturbance to the distribution of the fibers. In other embodiments, the deformed fibers can be mixed with a binder, e.g., amyl acetate or collodion (a nitrocellulose), and the mixture is pressed in a die and collar set using an anvil press to form a mat.

Subsequently, a load can then placed on top of the mat of fibers. The loaded mat can be placed into a controlled atmosphere furnace and heated at a relatively low temperature, in air or oxygen to remove the binder and/or carrier from the mat while preserving the structural integrity of the mat. Then, the mat can be heated at a higher temperature, such as the softening temperature of fibers. While generally retaining their structural integrity, the fibers can fuse together where they touch or are in close proximity to form a plate. A mechanical stop or shim can be used to control the final desired dimensions and/or density. The conditions used to form the reticulated structure, such as temperatures and heating times, can be optimized, for example, as a function of the composition and physical properties of the fibers.

In other embodiments, the cylindrically-shaped fibers can be formed into a mat. When the fibers are subsequently heated and fused, the mat can be deformed, for example, stretched and/or compressed, to deform the fibers, for example, into ribbon-like fibers. Other embodiments of reticulated structures and methods of making reticulated structures are described in U.S. Ser. No. 60/474,547.

Figure 5A:
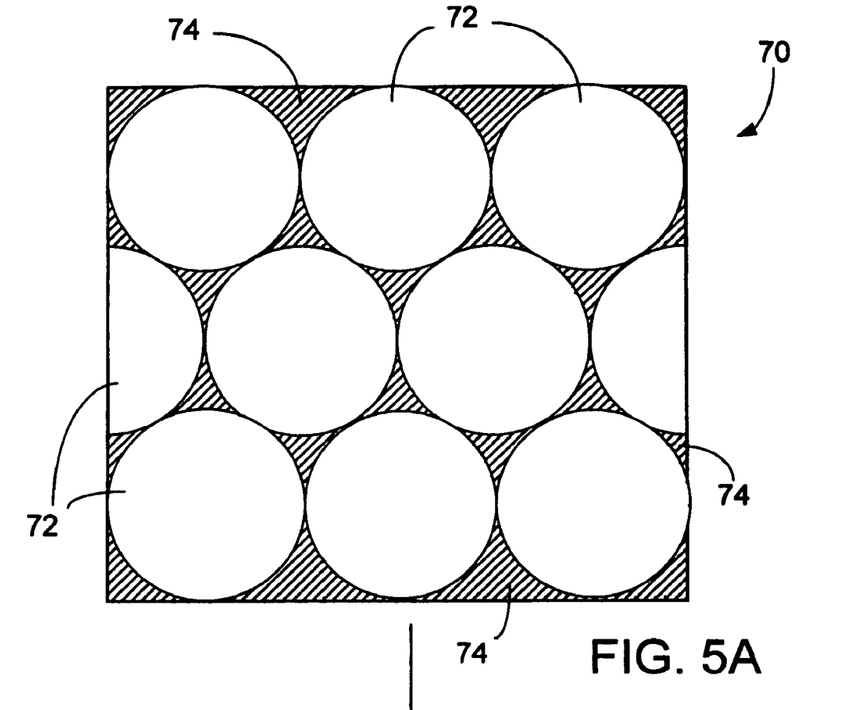
FIGS. 5A and 5B illustrate a method of making a reticulated structure.
Figure 5B:
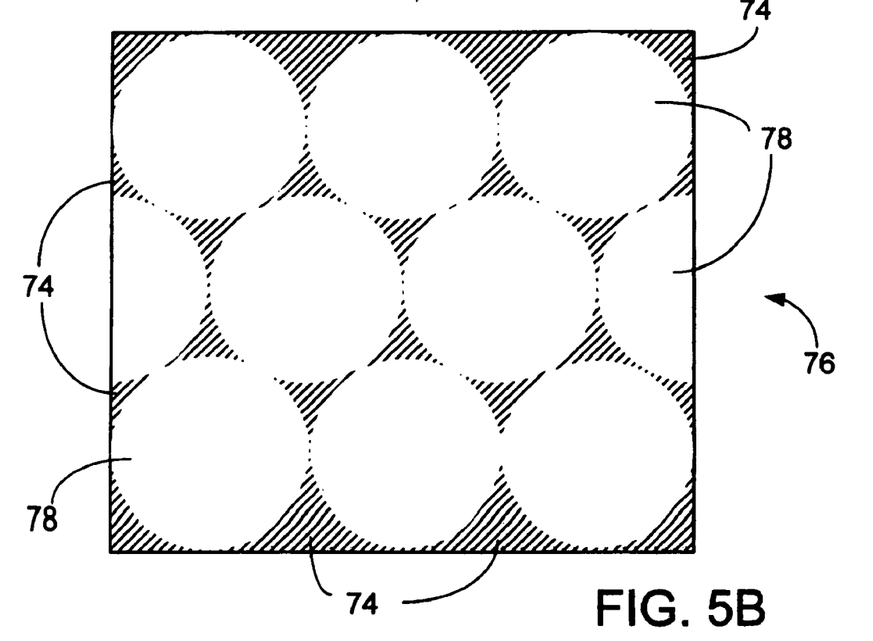

The reticulated structure can also be made using one or more methods. Referring to FIGS. 5A and 5B, a three-dimensional structure 70 includes a plurality of removable bodies 72 surrounded by, for example, a material capable of interacting with neutrons 74. As shown, bodies 72 are close-packed spheres, but other shapes, such as oval-shaped bodies or irregularly-shaped bodies, can be used. Bodies 72 can be made of any material that can be selectively removed, such as etchable glass or dissolvable polymers. In some embodiments, bodies 72 can be hollow to shorten the time need to remove the bodies. Referring to FIG. 5B, a reticulated structure 76 can be formed by selectively removing bodies 72 (for example, by etching away or dissolving the bodies), leaving material 74 to define voids 78 of the reticulated structure. In other embodiments, material 74 can be in the form of spheres (e.g., smaller and/or larger than bodies 72, fibers (e.g., as described herein), and/or chards. Embodiments of spheres, fibers, and chards are described, for example, in U.S. Ser. No. 10/138,854.

The volume external to reticulated structure 52 and between fibers 60 is filled with one or more gases 56. The neutron induced reaction products escaping from reticulated structure 52 deposit their residual energy into gas 56 by ionization of the gas atoms or molecules. The range of the neutron induced particle is dependent upon, for example, the stopping power of the gas and the gas density. The electrons (and/or atomic and molecular ions) released by the stopping of the neutron-produced-particles are directed by an electric field potential that permeates the entire or partial volume of detector 50 that includes gas 56 and reticulated structure 52. Therefore, the electrons and/or ions move to electrode 58 and produce an electrical pulse that can be detected by electronic equipment attached to the neutron detector. This pulse can be indicative of a radiation induced reaction in detector 50. In addition, the pulse may provide information on the amount of charge deposited in gas 56 by the neutron induced reaction. Examples of gases include noble gases (such as xenon, krypton, argon, neon, and helium (e.g., $^3$He), $^{14}$N, $^{10}$BF$_3$, carbon dioxide, carbon monoxide, nitrogen, hydrocarbons, and mixtures including these gases. Gas(es) 56 may or may not be neutron reactive, either absorbing or scattering.

Alternatively or additionally to gas(es) 56, the volume external to reticulated structure 52 and between fibers 60 can include, in part or in whole, a liquid, a glass, a gel, and/or a conductive material that has been selected for properties including, but not limited to, photon production by scintillating reaction with the neutron induced particle, electrical conductivity, stopping power, light transmission, ionization potential, neutron or gamma reactivity. For example, the volume external to reticulated structure 52 and between fibers 60 can include one or more phosphor materials (such as CsI, ZnS, or GdOS in a light conductive plastic or glass) that are capable of emitting photons following interaction from energetic charged particles or energetic photons. Fibers 60 can include one or more phosphor materials.

As shown in FIG. 2, electrode 58 is in the form of a wire, but electrode 58 can also have various configurations. Electrode 58 can include a network of wires that extend through the detector volume for collecting the electrical or optical pulse. Electrode 58 can be formed on one or more portions of the inner wall of housing 52. Electrode 58 may be a plate or plates that extend through detector 50 at various intervals, either regularly or irregularly. The surface of the reticulated structure may be treated to function, or may naturally function, as an electrode to sense the radiation reaction products.

While certain embodiments have been described, the invention is not so limited.

Figure 6:
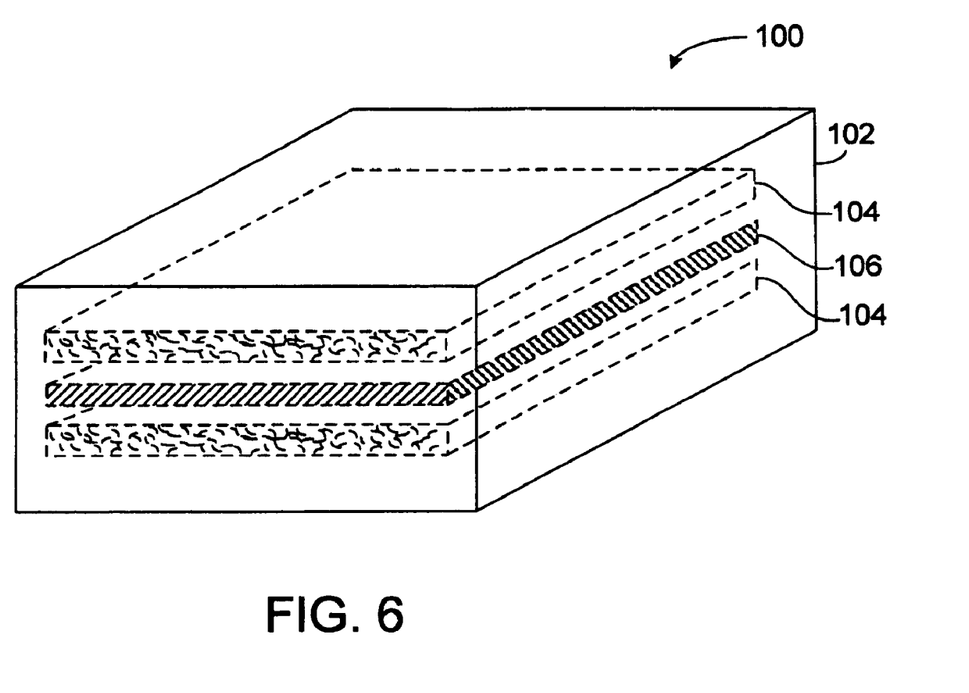
FIG. 6 is a perspective illustration of a detector.
Figure 7:
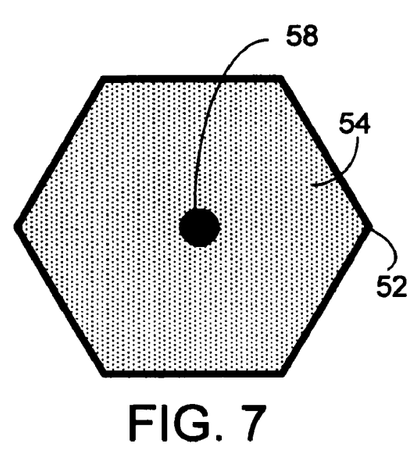
FIG. 7 is a cross-sectional view of a detector.
Figure 8:
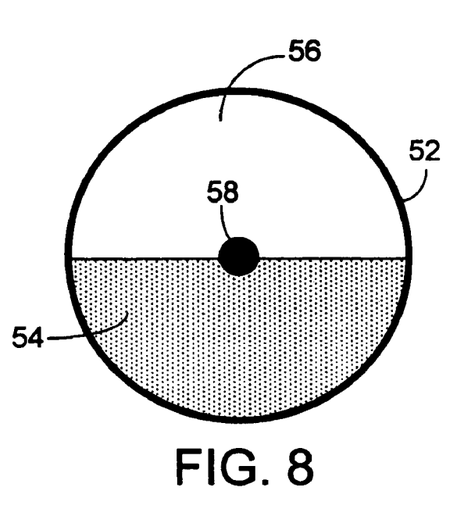
FIG. 8 is a cross-sectional view of a detector.

Detector 50 can have various configurations. Detector 50 may take the form of a portion of a cylinder or other shape, e.g., polygon or plate structure. Detector 50 may be flat, such as a rectangular box shape. For example, referring to FIG. 6, a detector 100 includes a housing 102, two reticulated structures 104 in the housing, and an electrode 106 between the reticulated structures. Detector 100 further includes one or more materials, such as gas 56, in the housing. Electrode 106 can be a plate, a wire mesh, or one or more wires. Detector 100 can include one reticulated structure or more than two reticulated structures. Another embodiment may be in the form of a sphere, a half sphere, a hemisphere of various wall thickness, or other fractions of a sphere, including geometries with holes that extend through the body of the sphere to allow beams or other instruments to extend through or into the detector. Detector 50 may be constructed in a variety of thicknesses. Reticulate structure 54 can have a non-circular cross section, such as a polygonal cross section (FIG. 7), an oval cross section, or an elliptical cross section. The thickness of structure can be uniform or non-uniform along a length of a detector. Reticulated structure 54 may not completely surround electrode 58. For example, referring to FIG. 8, reticulated structure 54 can surround half of electrode 58, with the other half of the detector occupied by one or more neutron sensitive materials, or one or more other reticulated materials. Alternatively, the housing can be flat to form a half cylinder. Reticulated structure 54 can be spaced from electrode(s) 58 or contact the electrode(s).

The volume of housing 52 and/or detector 50 may be fully or partial filled with reticulated structure 54. Detector 50 may be filled entirely with reticulated structure 54 or only in some regions as viewed from various external perspectives that may represent paths taken by incoming radiation. This can include, for example, a cylinder of reticulated material in a tube of gas to form the neutron detector. Reticulated structure 54 may be placed in the detector in a pattern where some regions contain no reticulated material. Reticulated structure 54 may extent the entire length of the gas tube or only exist along some portions of the length. The pattern may be pixellated in many small volumes or may occupy a substantial fraction of the entire detection volume.

A detector may include reticulated structures of different compositions in different areas of the detectors.

The reticulated structure can contact the housing and/or the electrode(s). The reticulated structure can be spaced from the housing and/or the electrode(s).

A detector may include readouts of one, two, and three dimension sensors. For example, there may be a number of independent electrodes in the detector or through the detector volume to sense location specific information about radiation entering and reacting with the detector. The electrodes may allow information to be read revealing the presence and rate of nuclear reactions as previously described.

In embodiments, weak ionizing muon and gamma ray events may be rejected by using discrimination and anticoincidence scintillators techniques. The cosmic ray gamma bursts and neutrons may be further mitigated by time averaging and differentiating techniques.

Figure 9:
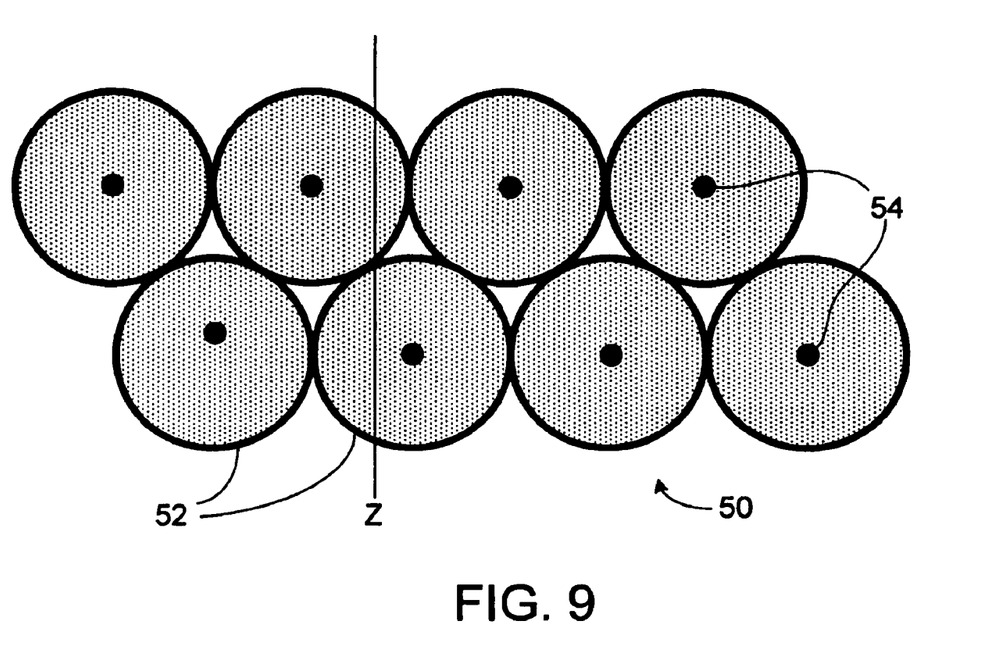
FIG. 9 is a cross-sectional view of an array of detectors.

The detectors described herein may be incorporated into other types of radiation detectors, e.g., to improve the detection efficiency. For example, the detector may be operated in conjunction with other radiation detectors for coincidence or anticoincidence detection of radiation data or other scientific data, e.g., vibration, temperature, and chemical composition. FIG. 9 shows that multiples detectors, as shown, cylindrical detectors, can be arranged in an array. Certain detector shapes or stacking patterns may provide an apparent uniform thickness of detector sensitive regions for particles traveling in the direction shown (arrow Z). Examples of other detectors include, but are not limited to, electron cascade multipliers (e.g., microchannel plates, microsphere plates, microfiber plates, microreticulated plates, and gas electron multipliers) and scintillator screens, and position sensitive readouts (e.g., resistive wire, anode encoders, resistive plate encoders, and cross line delay anodes, and electrets. Embodiments of detectors are described in U.S. Ser. No. 10/138,854, filed May 3, 2002, and U.S. Ser. No. 60/474,547, filed May 29, 2003. For example, the fibers can also be woven into a regular or repeating pattern.

The detectors and methods of detecting described herein can be used in a variety of applications. Examples of applications include those in which gas neutron detectors are employed, such as handheld or transportable survey units, personal dosimeters, neutron spectrometry in Bonner spheres, fast neutron radiography, neutron scattering, porthole monitoring, neutron beam or field monitoring, threshold-energy neutron detection, neutron scientific research instruments, cosmic ray detection, space based neutron detectors, planetary exploration, homeland security, health physics monitoring in research and power reactors, nuclear stock pile stewardship, and military and civilian investigative tools.

All applications, patens, and publications referred to above are hereby incorporated by reference in their entirety.

Other embodiments are within the claims.

What is claimed is:

1. A detector, comprising:
   a structure comprising a plurality of connected fibers defining spaces between the fibers; and
   a first material in the spaces, the first material being capable of interacting with charged particles to produce one or more electrons or photons;
   wherein the first material comprises a gas.

2. The device of claim 1, wherein the gas is capable of interacting with neutrons to produce electrons.

3. The device of claim 1, wherein the gas comprises a material selected from the group consisting of helium, boron fluoride, methane, isobutene, and a noble gas.

4. The device of claim 1, wherein the structure comprises a phosphor material.

5. The device of claim 1, wherein the structure comprises lead, gold, tungsten, or tantalum.

6. The device of claim 1, wherein the device is capable of detecting neutrons.

7. The device of claim 1, wherein the fibers have a width to thickness aspect ratio greater than one.

8. The device of claim 1, wherein the structure comprises a second material capable of interacting with incident radiation to produce one or more charged particles.

9. The device of claim 8, wherein the second material is capable of interacting with neutrons to produce one or more charged particles.

10. The device of claim 8, wherein the second materal is selected from a group consisting of $^6$Li, $^{10}$B, $^{113}$Cd, $^{149}$Sm, $^{151}$Eu, U, Pu, $^{155}$Gd, and $^{157}$Gd.

11. The device of claim 8, wherein the second material is in the fibers.

12. The device of claim 8, wherein the second material is a layer on a portion of the fibers.

13. A detector, comprising:
   a structure comprising a plurality of connected fibers defining spaces between the fibers; and
   a first material in the spaces, the first material being capable of interacting with charged particles to produce one or more electrons or photons;
   wherein the first material comprises a phosphor material.

14. The device of claim 13, wherein the first material is selected from the group consisting of cesium iodide, zinc sulfide, and gadolinium sulfide.

15. The device of claim 13, wherein the structure comprises a phosphor material.

16. The device of claim 13, wherein the structure comprises lead, gold, tungsten, or tantalum.

17. The device of claim 13, wherein the device is capable of detecting X-rays or gamma rays.

18. The device of claim 13, wherein the fibers have a width to thickness aspect ratio greater than one.

19. The device of claim 13, wherein the structure comprises a second material capable of interacting with incident radiation to produce one or more charged particles.

20. The device of claim 19, wherein the second material is capable of interacting with neutrons to produce one or more charged particle.

21. The device of claim 19, wherein the second material is selected from a group consisting of $^6$Li, $^{10}$B, $^{113}$Cd, $^{149}$Sm, $^{151}$Eu, U, Pu, $^{155}$Gd, and $^{157}$Gd.

22. The device of claim 19, wherein the second material is a layer on a portion of the fibers.

23. A method of detecting neutrons, the method comprising:
   contacting neutrons to a structure comprising:
      (i) connected fibers defining spaces between the connected fibers, and
      (ii) a first material in the spaces,
   the neutrons producing one or more charged particles;
   contacting the one or more charged particles to the first material to produce one or more photons; and
   detecting the one or more photons.

24. The method of claim 23, wherein detecting the one or more photons comprises accelerating the one or more photons to a photon detector.

25. The method of claim 23, wherein the first material comprises a gas.

26. The method of claim 25, wherein the gas comprises one of helium, boron fluoride, methane, isobutene, and a noble gas.

27. The method of claim 23, wherein the first material comprises a phosphor material.

28. The method of claim 27, wherein the phosphor material comprises one of cesium iodide, zinc sulfide, and gadolinium sulfide.

29. The device of claim 23, wherein the second material is in the fibers.

* * * * *

UNITED STATES PATENT AND TRADEMARK OFFICE
CERTIFICATE OF CORRECTION

| | |
|---|---|
| PATENT NO. | : 7,233,007 B2 |
| APPLICATION NO. | : 11/068589 |
| DATED | : June 19, 2007 |
| INVENTOR(S) | : R. Gregory Downing and W. Bruce Feller |

It is certified that error appears in the above-identified patent and that said Letters Patent is hereby corrected as shown below:

Col. 11, Line 44 (claim 2): Delete "device" and Insert -- detector --

Col. 11, Line 46 (claim 3): Delete "device" and Insert -- detector --

Col. 11, Line 49 (claim 4): Delete "device" and Insert -- detector --

Col. 11, Line 51 (claim 5): Delete "device" and Insert -- detector --

Col. 11, Line 53 (claim 6): Delete both instances of "device" and insert in both cases -- detector --

Col. 11, Line 55 (claim 7): Delete "device" and Insert -- detector --

Col. 11, Line 57 (claim 8): Delete "device" and Insert -- detector --

Col. 11, Line 60 (claim 9): Delete "device" and Insert -- detector --

Col. 11, Line 63 (claim 10): Delete "device" and Insert -- detector --

Col. 12, Line 1 (claim 11): Delete "device" and Insert -- detector --

Col. 12, Line 3 (claim 12): Delete "device" and Insert -- detector --

Col. 12, Line 12 (claim 14): Delete "device" and Insert -- detector --

Col. 12, Line 15 (claim 15): Delete "device" and Insert -- detector --

Col. 12, Line 17 (claim 16): Delete "device" and Insert -- detector --

Col. 12, Line 19 (claim 17): Delete both instances of "device" and Insert in both cases -- detector --

Col. 12, Line 21 (claim 18): Delete "device" and Insert -- detector --

Col. 12, Line 23 (claim 19): Delete "device" and Insert -- detector --

Col. 12, Line 26 (claim.20): Delete "device" and Insert -- detector --

Col. 12, Line 29 (claim 21): Delete "device" and Insert -- detector --

UNITED STATES PATENT AND TRADEMARK OFFICE
CERTIFICATE OF CORRECTION

PATENT NO.         : 7,233,007 B2
APPLICATION NO.    : 11/068589
DATED              : June 19, 2007
INVENTOR(S)        : R. Gregory Downing and W. Bruce Feller It is certified that error appears in the above-identified patent and that said Letters Patent is hereby corrected as shown below:

Col. 12, Line 32 (claim 22): Delete "device" and Insert -- detector --

Signed and Sealed this

Sixth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,233,007 B2
APPLICATION NO. : 11/068589
DATED : June 19, 2007
INVENTOR(S) : R. Gregory Downing and W. Bruce Feller It is certified that error appears in the above-identified patent and that said Letters Patent is hereby corrected as shown below:

Col. 11, Line 44 (claim 2): Delete "device" and Insert -- detector --

Col. 11, Line 46 (claim 3): Delete "device" and Insert -- detector --

Col. 11, Line 49 (claim 4): Delete "device" and Insert -- detector --

Col. 11, Line 51 (claim 5): Delete "device" and Insert -- detector --

Col. 11, Line 53 (claim 6): Delete both instances of "device" and Insert in both cases -- detector --

Col. 11, Line 55 (claim 7): Delete "device" and Insert -- detector --

Col. 11, Line 57 (claim 8): Delete "device" and Insert -- detector --

Col. 11, Line 60 (claim 9): Delete "device" and Insert -- detector --

Col. 11, Line 63 (claim 10): Delete "device" and Insert -- detector --

Col. 12, Line 1 (claim 11): Delete "device" and Insert -- detector --

Col. 12, Line 3 (claim 12): Delete "device" and Insert -- detector --

Col. 12, Line 12 (claim 14): Delete "device" and Insert -- detector --

Col. 12, Line 15 (claim 15): Delete "device" and Insert -- detector --

Col. 12, Line 17 (claim 16): Delete "device" and Insert -- detector --

Col. 12, Line 19 (claim 17): Delete both instances of "device" and Insert in both cases -- detector --

Col. 12, Line 21 (claim 18): Delete "device" and Insert -- detector --

Col. 12, Line 23 (claim 19): Delete "device" and Insert -- detector --

Col. 12, Line 26 (claim 20): Delete "device" and Insert -- detector --

Col. 12, Line 29 (claim 21): Delete "device" and Insert -- detector --

UNITED STATES PATENT AND TRADEMARK OFFICE
CERTIFICATE OF CORRECTION

PATENT NO. : 7,233,007 B2
APPLICATION NO. : 11/068589
DATED : June 19, 2007
INVENTOR(S) : R. Gregory Downing and W. Bruce Feller It is certified that error appears in the above-identified patent and that said Letters Patent is hereby corrected as shown below:

Col. 12, Line 32 (claim 22): Delete "device" and Insert -- detector --

Signed and Sealed this

Twenty-seventh Day of November, 2007

JON W. DUDAS
*Director of the United States Patent and Trademark Office*